(12) United States Patent
Bruno et al.

(10) Patent No.: US 11,962,486 B2
(45) Date of Patent: Apr. 16, 2024

(54) DETERMINING A PATH IN A COMMUNICATION NETWORK

(71) Applicant: Telefonaktiebolaget LM Ericsson (publ), Stockholm (SE)

(72) Inventors: Gianmarco Bruno, Genoa (IT); Daniele Ceccarelli, Stockholm (SE); Francesco Lazzeri, Genoa (IT); Jeroen Nijhof, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/307,415

(22) PCT Filed: Jun. 6, 2016

(86) PCT No.: PCT/EP2016/062800
§ 371 (c)(1),
(2) Date: Dec. 5, 2018

(87) PCT Pub. No.: WO2017/211385
PCT Pub. Date: Dec. 14, 2017

(65) Prior Publication Data
US 2019/0349286 A1   Nov. 14, 2019

(51) Int. Cl.
*H04L 45/02* (2022.01)
*H04L 45/12* (2022.01)
(Continued)

(52) U.S. Cl.
CPC .............. *H04L 45/04* (2013.01); *H04L 45/02* (2013.01); *H04L 45/12* (2013.01); *H04L 45/42* (2013.01); *H04L 45/742* (2013.01); *H04L 45/64* (2013.01)

(58) Field of Classification Search
CPC ......... H04L 45/04; H04L 45/02; H04L 45/12; H04L 45/42; H04L 45/742; H04L 45/64;
(Continued)

(56) References Cited

U.S. PATENT DOCUMENTS 5,878,029 A * 3/1999 Hasegawa ........... H04L 12/5602
370/236
7,876,689 B2 * 1/2011 McGee ................... H04L 45/12
370/238
(Continued)

FOREIGN PATENT DOCUMENTS

ES   2772714 T3   7/2020
ES   2781571 T3   9/2020
(Continued)

OTHER PUBLICATIONS

Ceccarelli, Daniele, et al., "Framework for Abstraction and Control of Traffic Engineered Networks", TEAS Working Group, Internet Draft, Apr. 14, 2016, 1-28.

*Primary Examiner* — Ian N Moore
*Assistant Examiner* — Latresa A McCallum
(74) *Attorney, Agent, or Firm* — Murphy, Bilak & Homiller, PLLC

(57) ABSTRACT

A method (100) of end-to-end path computation across a plurality of domains (20) in a communication network comprises receiving (101) a request for a path across the plurality of domains. The method comprises computing (110) in a network control entity (50) the end-to-end path across the plurality of domains as part of a hierarchical path computation. Computing the end-to-end path comprises determining if a stored path corresponding to at least a part of the end-to-end path matches one or more criteria of the end-to-end path, and if so, using the stored path for the end-to-end path computation. The method further comprises transmitting (120) information indicating at least part of the
(Continued)

stored path to a domain control entity (30) configured to control a said one of the plurality of domains involved in the end-to-end path.

16 Claims, 5 Drawing Sheets

(51) Int. Cl.
 *H04L 45/42* (2022.01)
 *H04L 45/74* (2022.01)
 *H04L 45/64* (2022.01)
(58) Field of Classification Search
 CPC ........ H04L 41/12; H04L 45/48; H04W 40/24; G06F 17/17
 See application file for complete search history.

(56) References Cited

U.S. PATENT DOCUMENTS

| | | | | |
|---|---|---|---|---|
| 8,559,334 | B2* | 10/2013 | Iovanna | H04L 45/02 370/254 |
| 8,854,956 | B2* | 10/2014 | Chen | H04L 45/04 370/229 |
| 9,413,634 | B2* | 8/2016 | Nadeau | H04L 45/50 |
| 2007/0217419 | A1* | 9/2007 | Vasseur | H04L 12/66 370/392 |
| 2013/0242804 | A1* | 9/2013 | Yabusaki | H04L 45/04 370/255 |
| 2013/0329601 | A1 | 12/2013 | Yin et al. | |
| 2014/0198662 | A1 | 7/2014 | Shimizu | |
| 2015/0200838 | A1* | 7/2015 | Nadeau | H04B 10/27 398/58 |
| 2015/0244607 | A1 | 8/2015 | Han | |
| 2016/0112327 | A1 | 4/2016 | Morris et al. | |
| 2016/0191370 | A1* | 6/2016 | Wood | H04L 41/12 370/238 |
| 2017/0187606 | A1* | 6/2017 | Chen | H04L 45/02 |

FOREIGN PATENT DOCUMENTS

| | | |
|---|---|---|
| ES | 2812478 T3 | 3/2021 |
| ES | 2830182 T3 | 6/2021 |
| ES | 2835326 T3 | 6/2021 |
| JP | 2013005045 A | 1/2013 |
| JP | 2014138244 A | 7/2014 |
| JP | 2019519157 A | 7/2019 |
| PT | 3391588 T | 1/2022 |
| WO | 2005001620 A2 | 1/2005 |
| WO | 2009118050 A1 | 10/2009 |
| WO | 2016074522 A1 | 5/2016 |
| WO | 2016102008 A1 | 6/2016 |
| WO | 2017211385 A1 | 12/2017 |

* cited by examiner

DETERMINING A PATH IN A COMMUNICATION NETWORK

TECHNICAL FIELD

The disclosure relates to a method of determining a path in a communication network, and a network control entity configured to determine a path in a communication network.

BACKGROUND

The IETF is currently working on a framework standardizing an interface between SDN controllers; this is called the Abstraction and Control of Transport Networks, ACTN, framework and is described in draft IETF document draft-ceccarelli-teas-actn-framework-02.txt of 14 Apr. 2016.

The ACTN framework defines two types of SDN controller: the Physical Network Controller, PNC; and the Multi Domain Service Controller (or Coordinator), MDSC. The PNC is often provided by the same vendor of the network to be controlled and often proprietary interfaces are used between the controller and the nodes. By means of a standard interface, which does not deal with physical impairments of nodes specific characteristics and based on standard models, it is possible to have a parent SDN controller, the MDSC, which allows for end to end path computation and provisioning based on an abstracted view of the network.

ACTN is an emerging SDN paradigm, in order to facilitate virtual network operation and the creation of a virtualized environment allowing operators to view and control multi-subnet and multi-technology networks into a single virtualized network. This will accelerate rapid service deployment of new services, including more dynamic and elastic services, and improve overall network operations and scaling of existing services In ACTN the control of the network is multi-stage. A set of PNC are in charge of managing the relevant network domains.

The MDSC is logically located on top of the PNCs and enables the management of the network, e.g. global network. The MDSC allows the maintenance of end-to-end services across the different domains, defining virtual networks spanning across the domains and providing additional services.

The approach of having a MDSC controlling a PNC in each domain means that there is no need for the MDSC to be aware of the specific technology or internals of the network elements managed by each domain, as this is carried out by the relevant PNC. In addition, there is no need for the MDSC to know in detail the internal topology and resources of each domain. This may be a requirement of security when the domains/PNCs and the MDSC are not owned by the same provider.

According to draft IETF document draft-ceccarelli-teas-actn-framework-02.txt of 14 Apr. 2016, the MDSC is provided by the PNCs with an abstract view of their topology. The abstract topology view hides the internal details of the relevant domains. In some aspects, this abstract topology view can be provided as a single pseudo-node per domain, using the inter-domain links to connect to other domain pseudo-nodes.

When computing a global end-to-end path, the MDSC computes a set of alternative end-to-end paths in the global abstract topology. The MDSC will then instruct each involved PNC to resolve their portion of the end-to-end path. This may be considered as a hierarchical path computation concept.

If this is possible, the global path will be deployed, using the PNCs as actuators. Otherwise, alternative paths will be tried until a successful path is found. The abstract topology view provided by the PNCs as described above may be insufficient for the MDSC to compute accurate paths.

Therefore, the set of alternative paths will often be tried for more than just one path in a trial-and-error process. This makes the path computation slower and does not guarantee the optimum path. The trial and error process is quite expensive as it requires and intensive protocol exchange between MDSC and PNCs.

On the other hand, providing more information about topology, while violating in whole or in part the security requirements, still does not guarantee an accurate MSDC path computation. If the full topology and resource information is exported from a PNC to the MDSC, this of course breaks the hierarchical path computation concept. Therefore, an improved hierarchical path calculation process is required.

SUMMARY

A first aspect of the disclosure provides a method of end-to-end path computation across a plurality of domains in a communication network. The method comprises receiving a request for a path across the plurality of domains, and computing in a network control entity the end-to-end path across the plurality of domains as part of a hierarchical path computation. The computing the end-to-end path comprises determining if a stored path corresponding to at least a part of the end-to-end path matches one or more criteria of the end-to-end path, and if so, using the stored path for the end-to-end path computation. The method further comprises transmitting information indicating at least part of the stored path to a domain control entity configured to control a said one of the plurality of domains involved in the end-to-end path.

Thus, end-to-end path computation is improved.

In some examples, the stored path is a domain segment across a said domain of the network.

In some examples, the stored path is the end-to-end path across the plurality of domains.

In some examples, the network control entity receives summarized topology information from the domain control entity.

In some examples, the method further comprising determining if a said part of the end-to-end path is determined to not match a stored path, the method further comprises:

transmitting a path computation request to a said domain control entity, receiving a resultant path from the domain control entity, and storing the resultant path.

In some examples, the network control entity is a Multi Domain Service Coordinator and/or the domain control entity is a Physical Network Controller.

In some examples, the method further comprising receiving information indicating a residual bandwidth, and storing information indicating the residual bandwidth such that the information indicating the residual bandwidth is associated with a said stored path.

In some examples, the method comprises receiving information indicating a residual bandwidth is received after the end-to-end path is determined to be successfully established.

In some examples, the network control entity requests a residual bandwidth from a said domain control entity, and the receiving information indicating the residual bandwidth is from the domain control entity in response to the request for the residual bandwidth.

In some examples, the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

In some examples, the method comprises choosing a relaxation step, determining if the relaxation step crosses a domain, and if so, determining if a stored path crossing the domain matches one or more criteria of the relaxation step, and if so, performing the relaxation step.

A further aspect of the disclosure provides, a network control entity for end-to-end path computation across a plurality of domains in a communication network. The network control entity is configured to receive a request for a path across the plurality of domains and compute the end-to-end path across the plurality of domains as part of a hierarchical path computation. The network control entity is configured to determine if a stored path corresponding to at least a part of the end-to-end path matches one or more criteria of the end-to-end path, and if so, the network control entity is configured to use the stored path for the end-to-end path computation. The network control entity is configured to transmit information indicating at least part of the stored path to a domain control entity configured to control a said one of the plurality of domains involved in the end-to-end path.

In some examples, the stored path is a domain segment across a said domain of the network.

In some examples, the network control entity is configured to receive summarized topology information from the domain control entity.

In some examples, the network control entity is configured to determine if a said part of the end-to-end path does not match a stored path, and if so, the network control entity is configured to: transmit a path computation request to a said domain control entity, receive a resultant path from the domain control entity, and store the resultant path.

In some examples, the network control entity is a Multi Domain Service Coordinator and/or the domain control entity is a Physical Network Controller.

In some examples, the network control entity is configured to receive information indicating a residual bandwidth, and configured to store the information indicating the residual bandwidth such that the information indicating the residual bandwidth is associated with a said stored path.

In some examples, the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

A further aspect of the disclosure provides, a network control entity for end-to-end path computation across a plurality of domains in a communication network. The network control entity comprising processing circuitry, the processing circuitry being configured to cause the network control entity to receive a request for a path across the plurality of domains and compute the end-to-end path across the plurality of domains as part of a hierarchical path computation. The processing circuitry is configured to determine if a stored path corresponding to at least a part of the end-to-end path matches one or more criteria of the end-to-end path, and if so, the processing circuitry is configured to use the stored path for the end-to-end path computation. The processing circuitry is configured to transmit information indicating at least part of the stored path to a domain control entity configured to control a said one of the plurality of domains involved in the end-to-end path.

In some examples, the stored path is a domain segment across a said domain of the network.

In some examples, the processing circuitry is configured to receive summarized topology information from the domain control entity.

In some examples, the processing circuitry is configured to determine if a said part of the end-to-end path does not match a stored path, and if so, the processing circuitry is configured to: transmit a path computation request to a said domain control entity, receive a resultant path from the domain control entity, and store the resultant path.

In some examples, the network control entity is a Multi Domain Service Coordinator and/or the domain control entity is a Physical Network Controller.

In some examples, the processing circuitry is configured to receive information indicating a residual bandwidth, and configured to store the information indicating the residual bandwidth such that the information indicating the residual bandwidth is associated with a said stored path.

In some examples, the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

A further aspect of the disclosure provides a network control entity for end-to-end path computation across a plurality of domains in a communication network. The network control entity comprises an interface module configured to receive a request for a path across the plurality of domains and a path determining module configured to compute the end-to-end path across the plurality of domains as part of a hierarchical path computation. The path determining module is configured to determine if a stored path corresponding to at least a part of the end-to-end path matches one or more criteria of the end-to-end path, and if so, the path determining module is configured to use the stored path for the end-to-end path computation. The interface module is configured to transmit information indicating at least part of the stored path to a domain control entity configured to control a said one of the plurality of domains involved in the end-to-end path.

In some examples, the stored path is a domain segment across a said domain of the network.

In some examples, the path determining module is configured to receive summarized topology information from the domain control entity.

In some examples, the path determining module is configured to determine if a said part of the end-to-end path does not match a stored path, and if so, the interface module is configured to transmit a path computation request to a said domain control entity, receive a resultant path from the domain control entity, and the path determining module is configured to store the resultant path.

In some examples, the network control entity is a Multi Domain Service Coordinator and/or the domain control entity is a Physical Network Controller.

In some examples, the path determining module is configured to receive information indicating a residual bandwidth, and the storage module is configured to store the information indicating the residual bandwidth such that the information indicating the residual bandwidth is associated with a said stored path.

In some examples, the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

A further aspect of the disclosure provides a carrier containing a computer program comprising instructions which, when executed on at least one processor, cause the at least one processor to carry out the method according to any example.

BRIEF DESCRIPTION OF THE DRAWINGS

Embodiments of the disclosure will now be described, by way of example only, with reference to the accompanying drawings, in which.

DETAILED DESCRIPTION

Aspects of the disclosure maintain the original topology abstraction approach of the hierarchical path computation. Embodiments add a mechanism allowing the MDSC to store and reuse the best paths, for example, after computation of a path. This allows the MDSC to learn incrementally.

The MDSC is configured to access a store of successful paths in a route cache table. When the MDSC receives a request for an end-to-end path computation, the MDSC performs a look up of the table for a matching request. If such a matching path is present in the table, this path will be used in the path computation, e.g. tried before the alternative paths.

Figure 1:
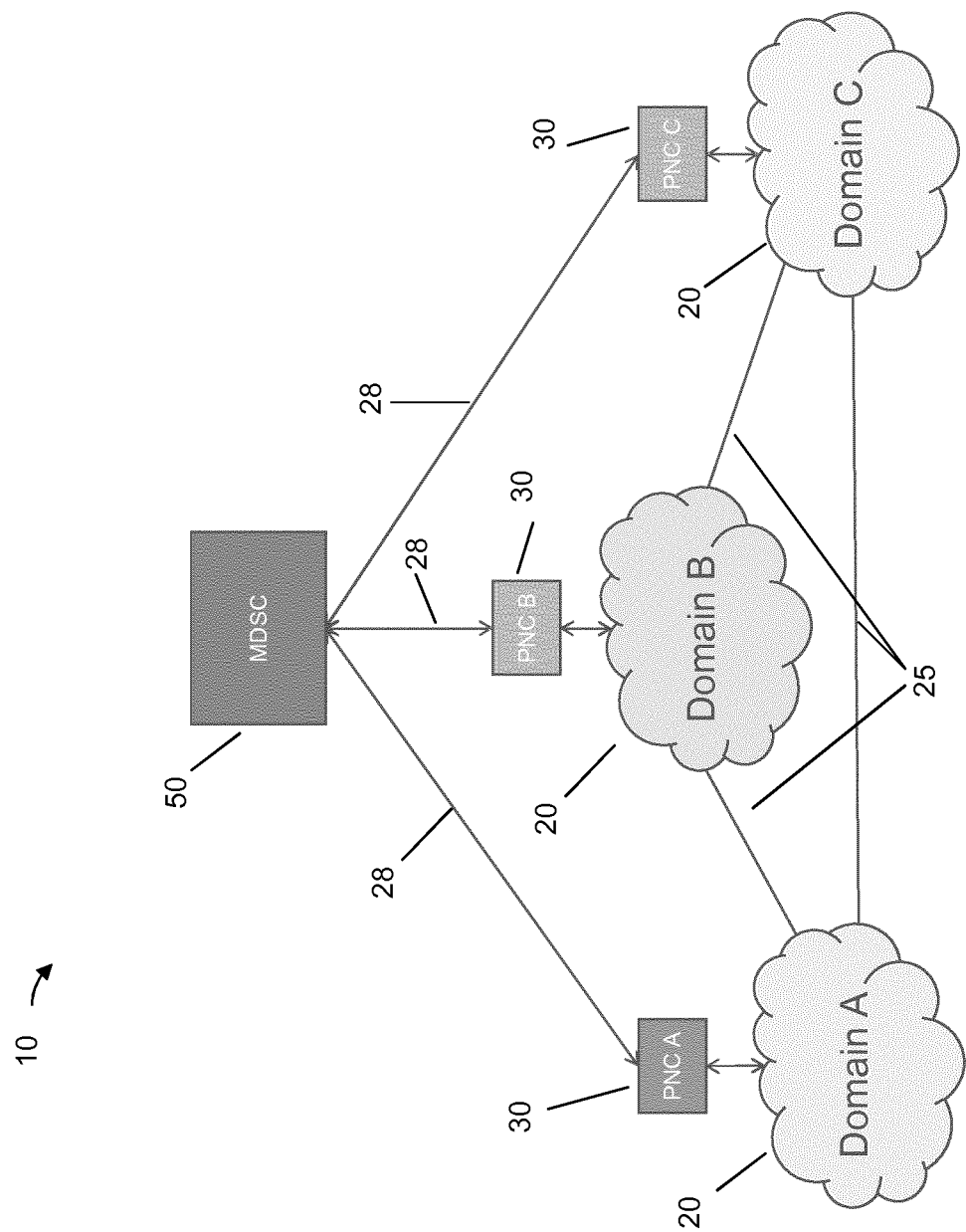
FIG. 1 shows an overview of a communication network.

FIG. 1 shows a network 10 comprising a plurality of domains 20. Each domain 20 comprises a plurality of network nodes (not shown) and a plurality of links (not shown) connecting the network nodes. The domains 20 are connected by one or more links 25. The links 20 may carry data traffic according to a computed path. The nodes of each of the domains 20 are controlled by domain control entity 30. In some aspects, the domain control entity 30 is a PNC, i.e. configured to control one or more layer of the network in a domain 20.

In some aspects, the domain control entity 30 may comprise one or more of a server layer of the network in a domain and/or a client layer of the network in a domain. In an embodiment, the server network is an optical network and the client network is a packet network. The packet network uses the server optical network to transport packets. In some aspects, the network may be considered as comprising a server layer being an optical layer, and a client layer being a packet layer.

A network control entity 50 is communicatively connected to each domain control entity 30 using connections 28. In some examples the network control entity 50 may be considered as an MDSC.

The network control entity 50 and domain control entities 30 may each be considered as a SDN controller. The SDN controllers are arranged as a hierarchy of SDN controllers.

For example, the MDSC 50 may be considered as at a higher level in the hierarchy than the PNCs 30 to which the MDSC is connected.

The MDSC 50 may be considered as a parent controller to the PNCs. Any aspect of the ACTN architecture or functionality may be considered as implemented as part of the present solution.

The MDSC connects with one or more PNCs controlling domains as part of the network 10. In some examples, the MDSC connects with a plurality of PNCs. In some aspects, the MDSC is arranged in an architecture between a Customer Network Controller (not shown) configured to issue connectivity requests and the PNCs configured to manage the physical network resources). The MDSC can be co-located with at least one of the PNCs. The MDSC is able to implement at least one of the four ACTN main functionalities, i.e. multi-domain coordination function, virtualization/abstraction function, customer mapping function and virtual service coordination.

The Physical Network Controllers described are configured to control configuring the network elements and/or monitoring the physical topology of the network. In some examples, a PNC is configured to pass the physical topology, either raw or abstracted, to the MDSC. A PNC, in addition to being in charge of controlling the physical network, is able to implement at least one of the ACTN main functionalities of: multi domain coordination function and virtualization/abstraction function. For example, the PNC can export the topology of the underlying network in a plurality of ways. The two extremes of information on the topology provided may be referred to as "white" and "black". A "white" topology gives visibility of all details of (a slice of the) network, whilst a "black" topology shows only the access points. Aspects of the present disclosure is applicable to any level of information passed from the PNC to MDSC.

The same reference numbers will used for corresponding features in different embodiments.

In an embodiment, the at least one characteristic of the path (e.g. service characteristic) comprises at least one of bandwidth, delay, delay variation, error rate, packet drop probability and packet congestion status, e.g. any or all the attributes defined in the control of traffic-engineered networks.

The current ACTN framework defines Physical Network Controllers, PNC, that interface directly with a network (i.e. network elements or nodes) and are responsible for its full control. For many reasons, the network may be split into several sub-networks or domains, each controlled by its own PNC. For example, a network provider may not want to expose the details of its products, thus they need to be controlled with a proprietary PNC, with non-standard interfaces towards the nodes. In a further example, a network may be too large and pose scalability challenges for a PNC implemented in a single application; or a network operator may want to split the administration (and control) of its network into different domains. In order to meet these needs, the ACTN framework defines Multi-domain Service Controllers, MDSC, to allow integration of several PNCs into a single large scale network. The ACTN framework allows the deployment of a hierarchy of MDSCs, supporting the definition of complex control architectures.

In this embodiment, the method is implemented at an MDSC within the ACTN framework. An aspect of the disclosure provides for an MDSC implementing the functions described. The network control entity (e.g. MDSC) comprises a PCE. The PCE is configured to determine a global end-to-end path across the network 10. The MDSC determines the end-to-end paths in the global abstract topology. The PCE in the network control entity may be considered as a parent PCE. The network control entity 30 is configured to instruct each involved domain control entity (e.g. PNC) to resolve the portion of the end-to-end path in the controlled domain. The domain control entity comprises a PCE in order to compute a path within the domain. The PCE in the domain network control entity may be considered as a child PCE. The parent PCE determining paths across domains (i.e. end-to-end or a global path) in combination with a child PCE determining paths within a domain may be considered as a hierarchical path computation.

In examples of the present disclosure, the Parent PCE in the MDSC is arranged to access a storage or storage medium. The storage may be considered a part of the MDSC or external to the MDSC. The storage comprises information relating to paths in the network 10. The information is structured to allow retrieval of paths matching one or more criteria. The one or more criteria provide for selection of a stored path which is the same or similar to a path which is requested. At least some of the stored information (i.e. rows) may be for an end-to-end path, and at least some of the stored information may be for a path within a domain. In some examples, the stored information comprises a row for the end-to-end path and one row for each domain segment included in the end-to-end path. In some aspects, storage of duplicate information is avoided.

In some examples, the information may be stored in a table (e.g. a cache table) with a structure having one or more of the information types shown in Table 1:

domain. In some examples, a path through a domain is considered as a single link in the abstracted (or summarized) topology considered by the MDSC, e.g. endpoints within each domain segment. Thus, the MDSC considers the ingress and egress points into/from the domain define the single link in the abstracted topology available. The PNC is responsible for implementing the actual, more complex, path within the domain segment.

Stored route: the route computed for this stored path. The route includes the domains traversed by the path with, for each domain, the ingress and egress points.

Returned metrics: the metrics resulting from the last activation of the service. Examples of metrics are the IGP metric, number of hops, or latency of the LSP. This field stores the metric computed by the PNC and returned in the PNC response (as described below).

Residual bandwidth: The residual bandwidth indicates a bandwidth available for carrying data on the path. For example, the residual bandwidth is the minimum of the residual bandwidths available in each domain traversed by the path. In some examples, the residual bandwidth is reported by each domain traversed by the path. For one domain, the residual bandwidth is the minimum of the bandwidth still available on the links traversed by the path inside that domain. The receiving and storing of the residual bandwidth is optional. The residual bandwidth allows future path computations to be more accurate, since the residual bandwidth provides an indication of whether the domain is able to handle further path requests on the same path previously selected. For example, a path computation may determine a path in a domain. Aspects of the disclosure re-use the same path, since the path is stored as a functioning path. However, one or more earlier path requests may have taken the bandwidth, and so the same path cannot handle further data traffic. Therefore, storing the residual bandwidth allows the network control entity to determine if the same path (e.g. a domain segment) can continue to be used for further path requests.

TABLE 1

| Signature (key) | Timestamp | Ingress | Egress | Stored Route | Returned Metrics | Residual Bandwidth | Objective Metrics | Other parameters |
|---|---|---|---|---|---|---|---|---|

Where:

Signature: key of the cache table. The signature is a combination of (or derived from) one or more of the fields in the table: Ingress, Egress, Objective Metrics and Other parameters. The information type 'Other parameters' may comprise one or more parameters, e.g. stored separately (one column per parameter: we use the single term "other params" for brevity). A path request having a signature equal to the one of a given row of the cache, matches that row. In some examples, the signature is a label uniquely determined from the other fields, and in some examples, may be generated by a hash algorithm, e.g. MD5.

Timestamp: indicates a date and/or time, for example storing the last time the entry in the cache has been accessed. This field allows a policy to remove old entries.

Ingress/Egress: the end-points of the request. For the entries relating to the end-to-end path, these ingress and egress points are for the end-to-end path. For the entries relating to the domain segments, these ingress and egress points are for ingress and egress points of a path through a Metrics and other parameters: the objective metrics, bounds and the other constraints of the path request, for example as per IETF RFC5440 and successive PCE-related standards. The metrics and other parameters may be stored in one or more rows.

In some examples, for each of the stored end-to-end computed path, the table comprises:

One row for the end-to-end path

One row for a domain segment, e.g. each domain segment included in the end-to-end path The storage of information for an end-to-end path allows matching of a new path request to a previously computed end-to-end path. This allows a path computation (or determination) to be made in response to the request merely by retrieving the previously stored end-to-end path.

The storage of information for domain segments path allows matching of a segments of a new path request to a previously computed domain segment. This allows part of a path computation (or determination) to be made in response to the end-to-end request merely by retrieving the previously stored path for a domain (i.e. across a domain). The domain segment path may be considered as a part of the end-to-end path. The domain segment path extends across the domain. As such, an ingress point and an egress point are both on edges of the domain. This provides for a single path only across the domain to be stored and retrieved by the network control entity. In some aspects, this corresponds to the calculation of the end-to-end path by the network control entity, e.g. based on abstracted or summarized topology, and calculation within the domain by the domain control entity (i.e. hierarchical PCE). In addition to one or more domain segment paths, an end-to-end path may be considered to comprise one or more inter-domain paths, i.e. between domains.

Figure 2:
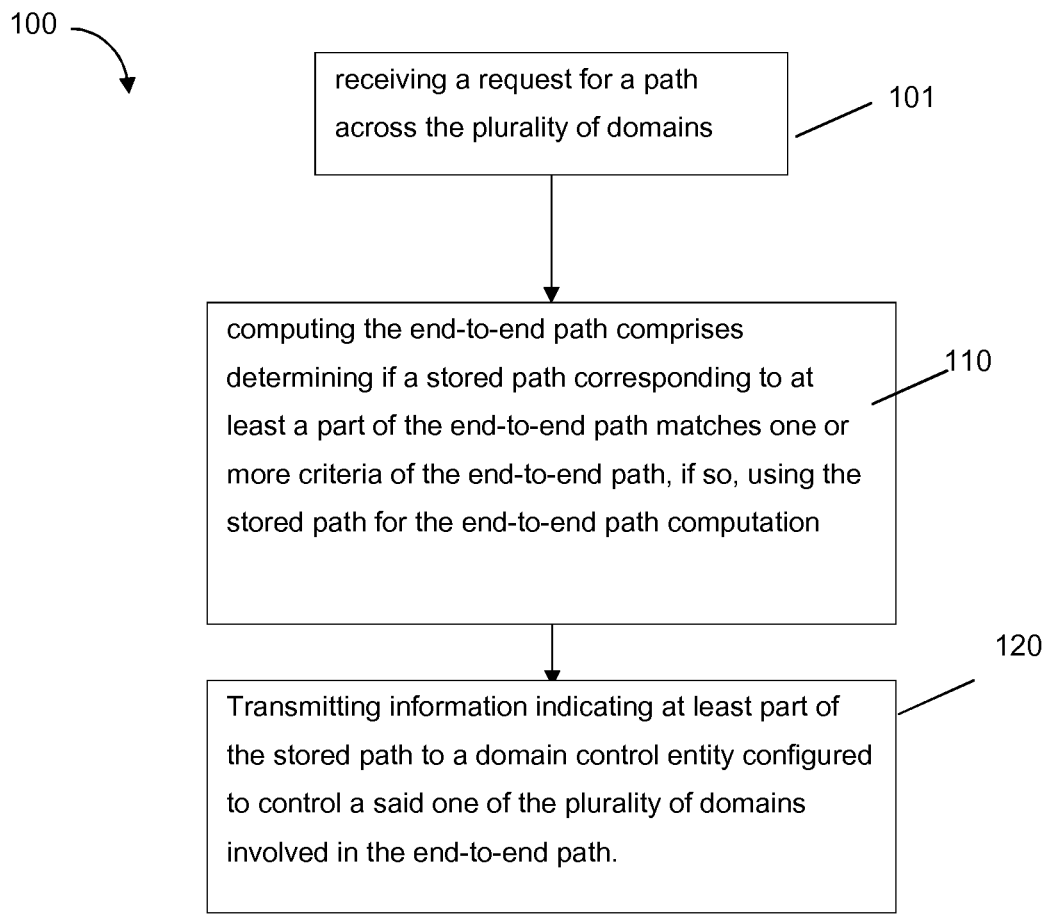
FIG. 2 shows a method according to an example of the disclosure.

FIG. 2 shows a method 100 for computing a path across a plurality of domains in a communication network. The method 100 may alternatively be considered as a method of determining or obtaining the path. In examples, the method 100 is implemented by the network control entity, e.g. MDSC.

In 101, the method comprises receiving a request for a path across the plurality of domains. In some examples, the request is received from the Customer Network Controller.

In 110, the method comprises computing in a network control entity the end-to-end path across the plurality of domains as part of a hierarchical path computation, wherein computing the end-to-end path comprises determining if a stored path corresponding to at least a part of the end-to-end path matches one or more criteria of the end-to-end path. If a stored path is determined to match the criteria, e.g. ingress node, egress node, the stored path is used for the end-to-end path computation. The used stored path may be a part only of the overall end-to-end path computation (e.g. across a single domain), or may be the entire path computation if the used stored path is an end-to-end path.

The stored path is based on abstracted topology information of the plurality of domains. As such, the path is computed as part of a hierarchical path computation.

In 120, the method transmits information indicating at least part of the stored path to a domain control entity configured to control a said one of the plurality of domains involved in the end-to-end path. In some examples, the transmitted information allows the domain control entity to establish the relevant part of the end-to-end path.

Figure 3:
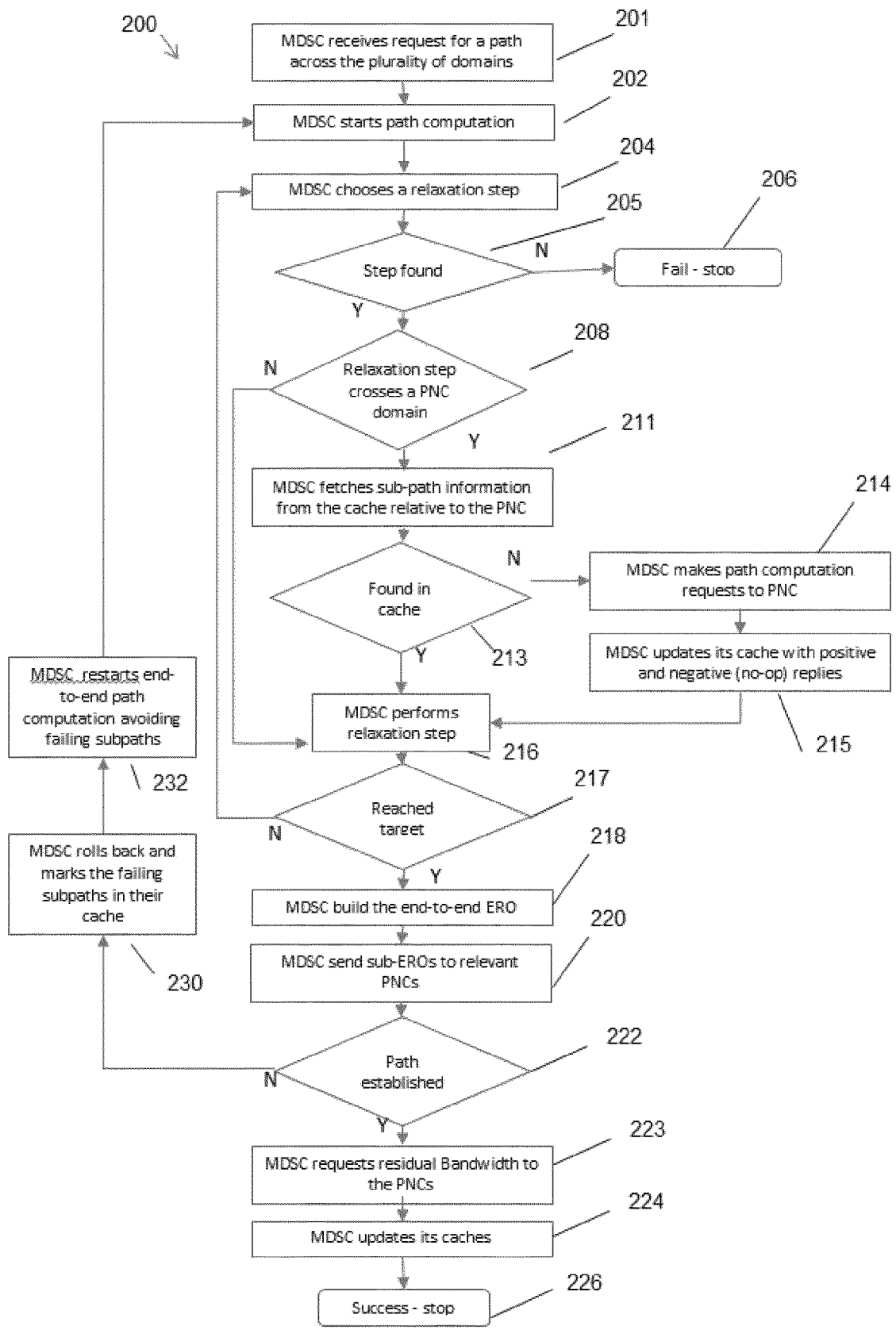
FIG. 3 shows a method according to a further example of the disclosure.

FIG. 3 shows a method 200 comprising further details for determining a path across a plurality of domains in a communication network. The method 200 may alternatively be considered as a method of computing or obtaining the path. In examples, the method 200 is implemented by the network control entity, e.g. MDSC.

In 201, the method receiving a request for a path across the plurality of domains. In some examples, the request is received from the Customer Network Controller. The method comprises determining a path across the plurality of domains by matching one or more criteria of the requested path with stored information on the domain segments.

In some example, the stored path is based on abstracted topology information of the plurality of domains. In some aspects, the path is computed as part of a hierarchical path computation. In some examples, the path is computed by a network control entity which is in communication with separate domain control entities for each domain. The establishment of the path is by a combination of the network control entity and domain control entities. For example, the network control entity computes or determines an end-to-end path using stored information of a path in the domain segments (or the entire end-to-end path), and provides an indication of the relevant part of the end-to-end path to each involved domain control entity for implementation in each domain. Thus, end-to-end path computation is improved, e.g. even without increased knowledge of the topology of the domains.

In 201, network control entity (e.g. MDSC) receives a request for a path across the plurality of domains. Aspects of the disclosure are of particular relevance to a network in which the network control entity receives only abstracted or summarized topology information from the domain control entities, although is also applicable to networks in which full topology information is provided.

In 202, the network control entity starts path computation. For example, the path computation is started based on received ingress and egress nodes, and any constraints on the path.

In 204, the network control entity identifies a possible step or link of the path from the egress node. This is referred to as choosing a relaxation step. For example, the terminology of a relaxation step corresponds to use of Dijkstra's algorithm for finding the shortest paths between nodes in a graph representing the network. The relaxation step may be considered as a process in path computation. The relaxation step is made by the path computation algorithm when exploring a new candidate path. Alternative paths are not discarded. The relaxation step (path computation) may take into account constraints on the path, e.g. latency or not using a forbidden administrative domain. The link identified by the relaxation step is analyzed in the following steps to determine whether it is feasible for the requested end-to-end path.

In 205, the network control entity determines if a relaxation step can be found. If a relaxation step cannot be found, the method stops at 206.

If a relaxation step can be found, the method continues in 208. In 208, the network control entity determines if the relaxation step crosses a domain, i.e. a domain controlled by a PNC. A step which crosses a domain is a step (or link in abstracted topology) which extends from one edge of the domain to another edge. Thus, a step crossing a domain is within the domain, i.e. across the domain. The network control entity considers a domain as crossed in a single step, jump or link. For example, this provides for effective hierarchical path computation (H-PCE), where the lower level PCE (i.e. PNC) computes the path within the domain to provide the single step, jump or link determined by the higher level PCE (i.e. MDSC).

If the relaxation step corresponds to a link which is an inter-domain link, i.e. between domains, the relaxation step is not considered to cross a domain. The inter-domain links may be considered as only visible to the network control entity, and/or are not controlled by either of the domain control entity controlling the domains at the ingress and egress nodes of the inter-domain link. For such an inter-domain link or step, (i.e. relaxation step is not crossing a domain), the method continues from 216 (described below). If the relaxation step is determined to cross a domain (i.e. a PNC controls the step), the method continues at 211.

In 211, the network control entity searches for information from the stored data. The information is sub-path information from the stored data relative to a particular domain (e.g. relative to the PNC) corresponding to the link (i.e. step) being evaluated. A stored link corresponding to the link being evaluated may be identified according to one or more criteria as described above, e.g. same ingress and egress points, same signature. The stored information on a step across a domain may have been previously provided by a PNC.

In 213, the network control entity determines if the sub-path information is found in the storage (i.e. stored table). Thus, the network control entity determines if the sub-path information to assist in path computation is already stored and can be used, or not available.

If a corresponding stored information on the step under evaluation is found in the storage (i.e. stored table), this allows the path computation to proceed to 216 without communication with the domain control entity to obtain this information.

The method continues at 214 if the network control entity determines that the relevant sub-path information is not available.

In 214, the network control entity makes path computation requests to a domain control entity (e.g. PNC). The PNC responds with a response complying with a standard response, e.g. complying with IETF RFC 5440. The response may be positive (i.e. the PNC indicates the step being evaluated can be provided by the domain), or negative (i.e. the PNC indicates the step being evaluated cannot be provided by the domain). In some examples, the PNC provides one or more metrics to the network control entity on the step or sub-path being evaluated, e.g. IGP metric, number of hops, latency of the LSP. In some aspects, the MDSC PCE can set a flag in its request to indicate that the MDSC PCE wants a computed metric from the PNC PCE. In this case the reply from the PNC PCE must contain the computed metric (e.g. hop count etc). This is regulated by a policy: the PNC PCE must be configured to respond in this way, otherwise it generates an error.

In 215, the network control entity stores the received information from the domain control entity. For example, the network control entity stores positive and negative (no-op) and/or the path metric responses to the path computation requests from the domain control entities, e.g. in the table described above.

In 216, the network control entity performs the relaxation step. The relaxation step may be based on the sub-path information obtained from the storage (in 211), or from the sub-path computation responses from one or more PNC (in 215). Alternatively, the relaxation step may be performed (e.g. link selected) based on a determination by the network control entity that the inter-domain link is possible, e.g. meets the path constraints. In some examples, for an inter-domain link, the network control entity performs the path computation as usual, e.g. without using a stored path. The performing the relaxation step may be considered as a preliminary selection of a link as part of the path being computed.

In 217, the network control entity considers if the target has been reached, i.e. whether the computed path has extended from the ingress node to the egress node of the end-to-end path. If the target is not determined to be reached (i.e. egress node not reached), the path computation process continues from 204 to determine a further step in the end-to-end path.

If the target is determined to be reached (i.e. path computed from ingress node to egress node), the network control entity starts the process of establishing the end-to-end path.

In 218, the network control entity generates the instructions for the end-to-end path, e.g. e.g. builds the end-to-end Explicit Route Object (ERO). In some examples, this is an extended ERO comprising an ordered list of domains of the end-to-end path.

In 220, the network control entity sends information to the relevant domain control entities to establish the path in the controlled domain(s). For example, the information is one or more sub-EROs. This information is specific only to the domain it is sent. The information (i.e. sub-ERO) allows a domain control entity to compute and establish a path based on the ingress node, egress node (and any constraints) provided in the information from the network control entity.

In 222, the network control entity determines if the end-to-end path is established successfully.

If the determination in 222 is that the end-to-end path is not established successfully, the method continues at 230. In 230, the network control entity rolls back the path establishment. The one or more failing sub-paths (i.e. paths in a domain) are marked as not suitable (i.e. failing) for the path in the stored table. For example, this may be because the stored information is no longer up to date. In 232, the network control entity re-starts the end-to-end computation avoiding the sub-paths marked as failing. The method returns to 202 for the network control entity to start path computation.

If the determination in 222 is that the end-to-end path is established successfully, the method optionally continues at 223. In 223, the method optionally requests residual bandwidth information from the domain control entities. Optionally in 224, the network control entity receives the requests residual bandwidth information from the domain control entities, and stores this information. The storage by the network control entity allows future path requests to be more accurate, e.g. by not attempting to establish a path along a link which no longer has sufficient bandwidth to handle the path request.

In 226, the method 200 finishes.

In some examples, the network control entity searches in the cache table, e.g. as described above, for an entry matching one or more criteria of a part of the requested path currently being evaluated (e.g. chosen as the relaxation step). The matching of the one or more criteria may be considered as satisfying the part of the path request. For example, the matched criteria may be one or more of ingress, egress, metrics and other request parameters. In some examples, the key signature is used to speed-up the process. For example, a key signature of the requested path is generated and compared to the key signatures of stored paths. If there is a match, this indicates that all of the fields used to generate the key signature also match.

In some examples, the network control entity determines if there is a stored path (e.g. a domain segment across a domain) which matches the one or more criteria. In some examples, a path is determined to be matching only if the relevant residual bandwidth is higher or equal to the requested bandwidth. In some examples, the method may proceed without determining by the network control entity if the relevant residual bandwidth is higher or equal to the requested bandwidth, e.g. if the network control entity does not have information on the relevant residual bandwidth.

In some examples, a request for metrics and/or the residual bandwidth is sent to the involved domain control entities. The metrics and/or information on the residual bandwidth is provided to the network control entity, and used to update the stored information. For example, the residual information received is stored for a path within the domain and/or the end-to-end path.

Thus, the results (including the new computed metrics) are used to update the per-domain rows in the cache accessed by the network control entity. The sum of the returned metrics is used to update the returned metrics field in the row of the end-to-end path.

Figure 4:
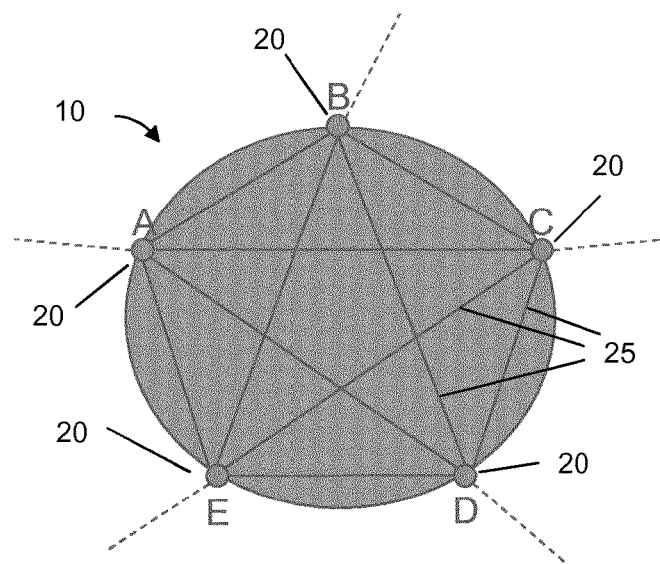
FIG. 4 illustrates an example topology used as part of the present disclosure.

In some examples, the network control entity (e.g. MDSC) performs a path computation on a topology where each domain is represented with a mesh of links interconnecting directly the end points of the domain. An example of this topology is shown in FIG. 4, having domains 20 connected by links 25.

In a further example, the network control entity is configured to carry out path computation by matching end-to-end path request with a stored end-to-end path. In this case, the method of FIG. 3 is simplified. For example, the method may be considered as receiving the request for a path in 201, and starting path computation in 202. In this case, the path computation 202 comprises retrieving the stored end-to-end path. The method may then proceed directly to step 218, and proceed with the following steps 220, 222, 223, 224, 230, 232 as appropriate.

The network control entity is configured to store information about a link, e.g. one or more metric and/or bandwidth available. In some examples, metrics and/or bandwidth of each link is derived from the corresponding entries in the table, e.g. cache rows. In some examples, entries in the table indicating a path failure (e.g. marked as -no-path-) may be kept for a time period and then be re-requested from the domain control entity. Alternatively, if no matching table entry (e.g. cache row) is found, the network control entity is configured to request the metrics and/or bandwidth information from the relevant domain control entity. In some example, after a positive response, a new entry in the cache is created. Alternatively, if no path is available between a couple of end-points, no link is created and a cache entry, indicating no path (e.g. -no path-) is created for it.

The network control entity (e.g. MDSC) is configured to compute a new candidate paths set. In some examples, the network control entity uses a normal hierarchical-PCE methodology. In some examples, the network control entity uses the enhanced topology, e.g. according to the stored paths. For example, using the enhanced topology will lead to a set of paths which is more likely feasible and optimized. The computed set of paths is tried against the relevant domain control entities (e.g. PNCs), and the resulting end-to-end path is found. When done, the new end-to-end path and domain segment rows are added/modified in the cache.

The network control entity (e.g. MDSC) and domain control entity (e.g. PNC) are configured to exchange communication messages. In some examples, one or more such messages comprises information on the residual bandwidth. The network control entity is configured to implement one or more features using the residual bandwidth information, as described above. In some examples, the network control entity implementing residual bandwidth features will try and negotiate this capability with the subtended domain control entities, even though no domain control entities are configured to implements providing residual bandwidth information).

In some examples, the communication protocol between the network control entity and the domain control entities are not changed by examples of the disclosure. Therefore, changes to the domain control entities are not required to be used with a network control entity according to examples of the disclosure. In further examples, the communication protocol and domain control entities are configured to support at least the network control entity according to examples of the disclosure, e.g. by determining and providing residual bandwidth information.

In some examples, the network control entity (e.g. MDSC) path computation is done with the conventional (e.g. trial-and-error) path computation mechanism. When a path is successfully found, the path details, including domains and inter-domain links sequence, cost and other parameters shown later in this document, are retained in a route cache table managed by the MDSC only.

For a further path computation request, the network control entity determines if a matching path (e.g. sub-path) is present in the table. If so, this matching path will be tried before the alternative paths according to some order (e.g. similarity and/or cost, timestamp). As the table size increases (i.e. more paths having stored information), the probability of a successful match increases as well and therefore the likelihood of finding the right path with just a single try gets higher, reducing the overhead of the hierarchical path computation.

Examples of the disclosure may be considered to provide an advantage with respect to the Per-Domain Path Computation (RFC5152). For example, aspects of the disclosure avoids the issue of crankback routing attempts and (after storing path examples), the network control entity may provide accurate path computations in complexly connected domains.

Examples of the disclosure may be considered to provide an advantage with respect to the Backward-Recursive PCE-Based Computation (RFC5441). For example, aspects of the disclosure mitigates its significant scaling issues by means of the caching.

In some aspects, the caching mechanism of the present disclosure requires a moderate implementation effort. For example, the network control entity comprises or accesses a table, a lookup algorithm and related options (determining how to assess the similarity of the path request, or how to give the entries the best relevance according to the time).

Optionally, residual bandwidth for the paths stored in the cache can be used. This requires an extension to a PCEP protocol where a path computation request with a new objective metric "residual bandwidth" or a specific residual bandwidth object may be used. This way the network control entity (e.g. MDSC) is provided with information from the domain control entities (PNCs) about the amount of bandwidth still available for the paths stored in cache.

Aspects of the disclosure may be considered as a parent PCE (e.g. as implemented using a network control entity) comprising a caching mechanism to register the path computation requests and replies in order to be used for subsequent requests. This allows subsequent requests to be more accurate. This cache can be populated incrementally during the life of the network, and/or a preliminary set of routes can be computed at the startup of the system for pre-loading the route cache.

In some examples, the method comprises abstracting topology information about each of the plurality of domains to represent the domain network in an abstracted form. The abstraction may enable communication of information from the domain to the network control entity, whilst hiding topology information about the domain from higher network control layers (e.g. the MDSC). In an embodiment, the abstraction of the topology information about the server network domains is performed according to the ACTN framework.

In an embodiment, the method is implemented at an MDSC of a multi-layer control network, according to the ACTN framework.

Figure 5:
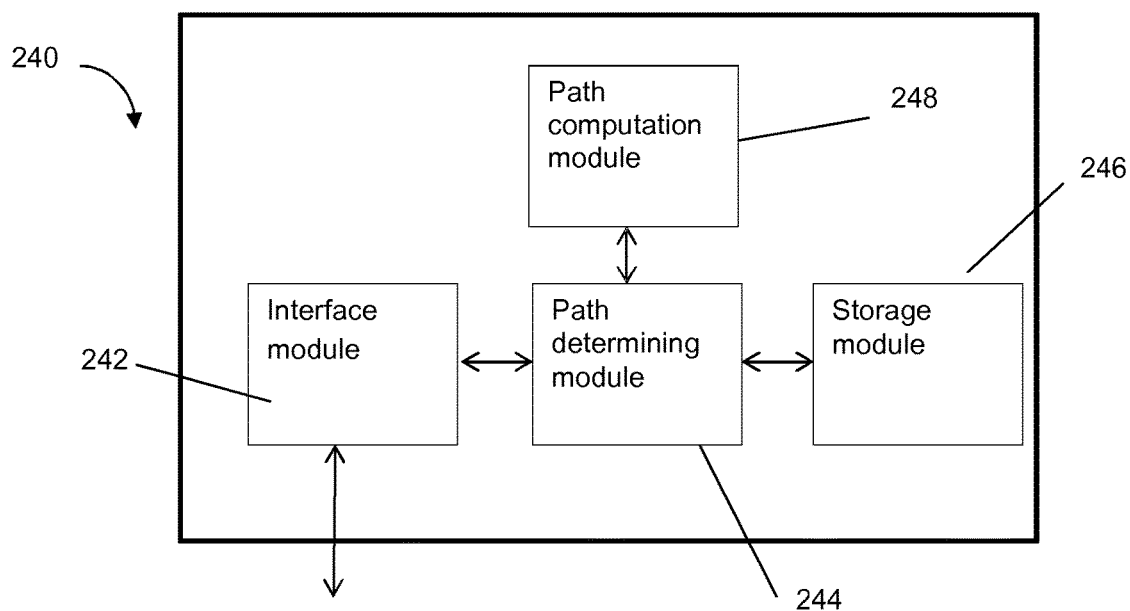
FIG. 5 shows an example of a network control entity.

FIG. 5 shows an example network control entity 240 corresponding to the network control entity 50, e.g. an MDSC. The network control entity comprises an interface module 242 for communication with the domain control entity of a plurality of domains.

A path determining module 244 is configured to access a storage module 246 to retrieve stored information of a path matching one or more criteria, as described above. If no matching path is stored (e.g. a path within a domain has not previously been calculated and stored, or the path is between domains), the path determining module 244 is configured to obtain a path from a path computation module 248, e.g. by requesting a path from a domain control entity (e.g. in association with the interface module 242 and/or path determining module) or carrying out a path calculation. The path determining module 244, interface module 242, path computation module 248, and/or storage module 246 are configured to carry out any part of the method or functions described for the network control entity.

The modules described may be implemented in software, firmware or hardware. A description of a separate module does not indicate a separate implementation, one or more modules may be implemented by the same software, firmware or hardware.

In some examples, the network control entity is for end-to-end path computation across a plurality of domains in a communication network. The network control entity comprises the interface module 242 configured to receive a request for a path across the plurality of domains. The network control entity further comprises the path determining module 244 configured to compute the end-to-end path across the plurality of domains as part of a hierarchical path computation. The path determining module 244 is configured to determine if a stored path corresponding to at least a part of the end-to-end path matches one or more criteria of the end-to-end path, and if so, the path determining module is configured to use the stored path for the end-to-end path computation. The interface module 242 is configured transmit information indicating at least part of the stored path to a domain control entity configured to control a said one of the plurality of domains involved in the end-to-end path.

In some examples, the stored path is a domain segment across a said domain of the network. In some examples, the path determining module 244 is configured to receive summarized topology information from the domain control entity.

In some examples, the path determining module is configured to determine if a said part of the end-to-end path does not match a stored path, and if so, the interface module is configured to transmit a path computation request to a said domain control entity, receive a resultant path from the domain control entity. The path determining module is configured to store the resultant path.

In some examples, the network control entity is a Multi Domain Service Coordinator and/or the domain control entity is a Physical Network Controller.

In some examples, the path determining module is configured to receive information indicating a residual bandwidth, and the storage module is configured to store the information indicating the residual bandwidth such that the information indicating the residual bandwidth is associated with a said stored path.

In some examples, the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

Figure 6:
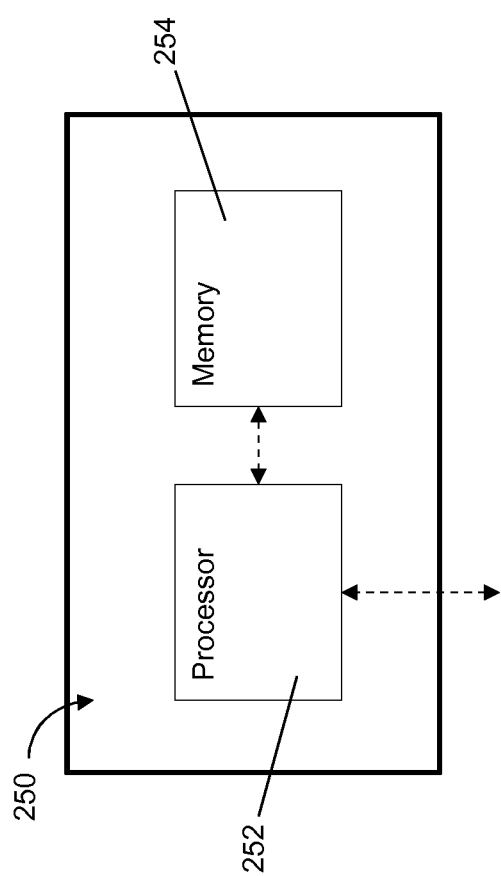
FIG. 6 shows a further example of a network control entity.

Referring to FIG. 6, shows an example network control entity 250 corresponding to the network control entity 50, e.g. an MDSC. The control entity 250 comprises a processor 252 and a memory 254. The memory contains instructions executable by the processor, whereby the control entity is operative to implement the method described in any example.

In some aspects, the memory contains instructions executable by the processor, whereby the control entity is operative to implement any example of the disclosure.

In an embodiment, the interface module 242, path determining module 244 and the path computation module 248 described above are implemented as a computer program running on the processor 252. In an embodiment, the storage module 246 may be implemented on the memory 254.

Each control entity (e.g. PNC or MDSC) may be implemented as one or more processors, hardware, processing hardware or circuitry. References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example. The memory of any example may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Alternatively, the memory used may be a transitory memory, e.g. RAM.

A further embodiment of the disclosure provides a computer program, comprising instructions which, when executed on at least one processor, cause the at least one processor to carry out any of the steps of the above described method of determining a path for communication network.

In a further example, the network control entity comprises a processor and a memory, the memory containing instructions that when executed by the processor cause the processor to carry out the method or functions of any example. In some aspects, the network control entity comprising processing circuitry, the processing circuitry being configured to cause the network node to carry out any example of at least a part of the method described.

Aspects of the disclosure may relate to a method or apparatus of the domain control entity. For example, the domain control entity may receive an instruction from the network control entity to make a path computation or implement a calculated path. In some examples, the domain control entity receives the request for residual bandwidth information from the network control entity. The domain control entity is configured to provide this information to the network control entity. In some examples, the domain control entity may be configured according to the apparatus of FIG. 6.

Aspects of the disclosure further relate to a system comprising the network control entity and domain control entity of any example.

A further embodiment of the disclosure provides a carrier containing a computer program, comprising instructions which, when executed on at least one processor, cause the at least one processor to carry out any of the steps of the above method of controlling a communication network. The carrier is one of an electronic signal, optical signal, radio signal, or computer readable storage medium.

Examples have been described referring to path calculation across a plurality of domains. In some examples, the path calculation is across a single domain or involves a single PNC. Any reference to transmitting may refer to initiating to transmit.

In an embodiment, the domain or network control entity 30, 50 is an SDN controller. In an embodiment, the abstraction module is configured to perform the abstraction according to the ACTN framework.

| Abbreviation | Explanation |
| --- | --- |
| ACTN | Automatic Control of Transport Networks |
| H-PCE | Hierarchical PCE |
| LSP | Label Switched Path |
| MDSC | Multi Domain Service Coordinator |
| PCC | Path Computation Client |
| PCE | Path Computation Element |
| PNC | Physical Network Controller |
| SDN | Software Defined Networking |

The invention claimed is:

1. A method of selecting an end-to-end path across a plurality of domains in a communication network, the method comprising:
receiving a request for a path across the plurality of domains;
computing, in a network control entity, the end-to-end path across the plurality of domains as part of a hierarchical path computation, wherein computing the end-to-end path comprises determining that a stored path matches one or more criteria of the end-to-end path, wherein the stored path is the end-to-end path across the plurality of domains, and, in response to said determining, using the stored path for the end-to-end path computation; and
transmitting information indicating at least part of the stored path to a domain control entity configured to control one of the plurality of domains involved in the end-to-end path.

2. The method of claim 1, wherein the network control entity receives summarized topology information from the domain control entity.

3. The method of claim 1, wherein the method further comprises:
determining that a part of the end-to-end path does not match any stored path,
transmitting a path computation request to said domain control entity, in response to determining that the part of the end-to-end path does not match any stored path,
receiving a resultant path from the domain control entity, and
storing the resultant path.

4. The method of claim 1, wherein (a) the network control entity is a Multi Domain Service Coordinator or (b) the domain control entity is a Physical Network Controller or (c) the network control entity is a Multi Domain Service Coordinator and the domain control entity is a Physical Network Controller.

5. The method of claim 1, further comprising receiving information indicating a residual bandwidth and storing information indicating the residual bandwidth such that the information indicating the residual bandwidth is associated with said stored path.

6. The method of claim 5, wherein the information indicating the residual bandwidth is received after the end-to-end path is determined to be successfully established.

7. The method of claim 5, wherein the network control entity requests residual bandwidth information from said domain control entity, and the information indicating the residual bandwidth is received from the domain control entity in response to the request for the residual bandwidth.

8. The method of claim 1, wherein the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

9. The method of claim 1, the method comprising:
choosing a relaxation step,
determining if the relaxation step crosses a domain, and if so,
determining if a stored path that corresponds to a path crossing the domain matches one or more criteria of the relaxation step, and if so,
performing the relaxation step.

10. A network control entity for end-to-end path computation across a plurality of domains in a communication network, the network control entity comprising processing circuitry, the processing circuitry being configured to cause the network control entity to:
receive a request for a path across the plurality of domains;
compute the end-to-end path across the plurality of domains as part of a hierarchical path computation, wherein computing the end-to-end path comprises determining that a stored path matches one or more criteria of the end-to-end path, wherein the stored path is the end-to-end path across the plurality of domains, and, in response to said determining, using the stored path for the end-to-end path computation; and
transmit information indicating at least part of the stored path to a domain control entity configured to control a one of the plurality of domains involved in the end-to-end path.

11. The network control entity of claim 10, wherein the processing circuitry is configured to receive summarized topology information from the domain control entity.

12. The network control entity of claim 10, wherein the processing circuitry is further configured to determine that a part of the end-to-end path does not match any stored path, and, in response, to:
transmit a path computation request to said domain control entity,
receive a resultant path from the domain control entity, and
store the resultant path.

13. The network control entity of claim 10, wherein (a) the network control entity is a Multi Domain Service Coordinator or (b) the domain control entity is a Physical Network Controller or (c) the network control entity is a Multi Domain Service Coordinator and the domain control entity is a Physical Network Controller.

14. The network control entity of claim 10, wherein the one or more criteria comprises one or more of: end-points of the path, ingress point, egress point, ingress point and egress point of a domain, ingress point and egress point of the end-to-end path, stored route, one or more returned metric, one or more objective metrics, one or more further parameters, a signature calculated on the plurality of criteria and residual bandwidth.

15. A non-transitory computer-readable medium comprising, stored thereupon, a computer program comprising instructions that, when executed on at least one processor, cause the at least one processor to:
  receive a request for a path across a plurality of domains;
  compute an end-to-end path across the plurality of domains as part of a hierarchical path computation, wherein computing the end-to-end path comprises determining that a stored path matches one or more criteria of the end-to-end path, wherein the stored path is the end-to-end path across the plurality of domains, and, in response to said determining, using the stored path for the end-to-end path computation;
  transmit information indicating at least part of the stored path to a domain control entity configured to control one of the plurality of domains involved in the end-to-end path.

16. The network control entity of claim 15, wherein the processing circuitry is configured to receive information indicating a residual bandwidth and to store the information indicating the residual bandwidth such that the information indicating the residual bandwidth is associated with said stored path.

* * * * *